United States Patent [19]

Takada

[11] Patent Number: 4,561,670
[45] Date of Patent: Dec. 31, 1985

[54] FRAME FOR AUTOMATED TWO-WHEEL VEHICLES, AND METHOD FOR ITS MANUFACTURE

[75] Inventor: Minoru Takada, Houya, Japan

[73] Assignee: Honda Giken Kogyo Kabushiki Kaisha, Tokyo, Japan

[21] Appl. No.: 497,474

[22] Filed: May 23, 1983

[30] Foreign Application Priority Data

May 28, 1982 [JP] Japan ................................. 57-89799
May 28, 1982 [JP] Japan ................................. 57-89800

[51] Int. Cl.⁴ .............................................. B62K 19/02
[52] U.S. Cl. .................................. 280/281 R; 403/272
[58] Field of Search ..................... 280/281 R; 403/272

[56] References Cited

U.S. PATENT DOCUMENTS 2,491,379 12/1949 Kraeft et al. ..................... 280/281 R
3,030,124 4/1962 Holloway ........................ 280/281 R

FOREIGN PATENT DOCUMENTS 2334556 7/1977 France ............................. 280/281 R Primary Examiner—Joseph F. Peters, Jr.
Assistant Examiner—Kenneth R. Rice
Attorney, Agent, or Firm—Pollock, Vande Sande & Priddy

[57] ABSTRACT

A pipe frame for a two or three-wheeled vehicle is formed by joining lugs having pipe receptors to other frame components such as seat rails and back stays. The parts are dimensioned so as to provide a slight clearance into which thermosetting resin is inserted. After assembly and finishing of the frame, the resin is set simultaneously with the baking on of the finish.

27 Claims, 18 Drawing Figures

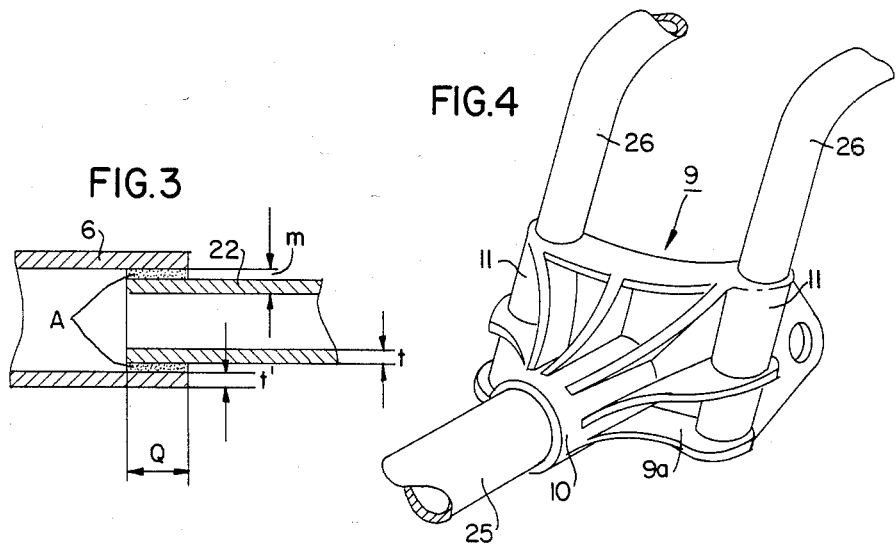
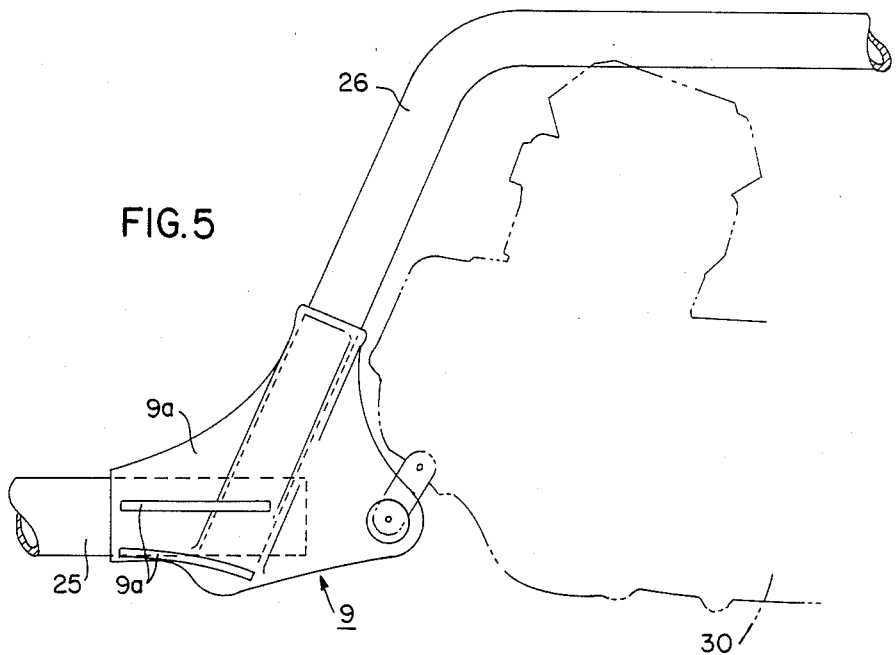
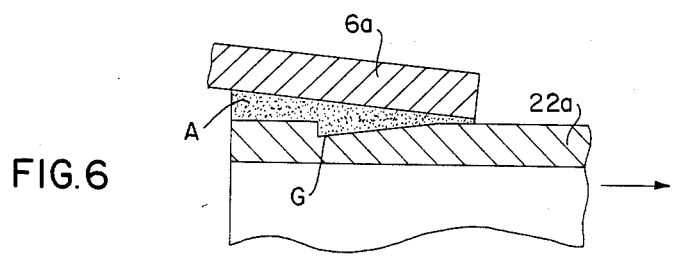

FRAME FOR AUTOMATED TWO-WHEEL VEHICLES, AND METHOD FOR ITS MANUFACTURE

SUMMARY OF THE INVENTION

The invention relates to frames for two-or-three-wheeled vehicles, and in particular to pipe frames, formed by joining lugs having pipe receptors for receiving other frame components with a predetermined clearance therebetween for the insertion of thermosetting resin. After assembly and painting, the resin is set simultaneously with the baking on of the finish.

BACKGROUND OF THE INVENTION

Frames used in automated two- or three-wheeled vehicles can be broadly classified as (a) those which use pipe as their primary material, i.e., pipe frames, and (b) those which use pressed steel plates, which are welded together to form a steel plate frame.

The latter type of construction permits automatic welding, which results in high productivity, but for reasons of strength, it is applicable only to light-weight vehicles. By contrast, pipe frame construction provides adequate strength, and this type of construction is widely used for a variety of leisure, sport, competition and touring vehicles.

In the past, cast or forged lugs have been used to connect the various types of pipe material. More recently, in order to produce lighter vehicles and to reduce costs, lugs have been eliminated in many cases in favor of arc welding or, in certain cases, by use of gussets made of steel plate and welding.

However, welded connections create several problems:

(1) If the welders are not highly trained, the welds will contain undercuts, overlaps or other deformities. When this kind of welding defect is present, because of the accumulation of stress upon the welded area, fatigue strength declines, so that further processing is required, such as polishing the weld area flat, shot blasting or shot peening, or heat treatment of the weld area. Obviously, this results in increased production costs.

(2) In order to reduce frame weight, high tensile strength steels have been used. When such steels have been subjected to tempering or annealing, the large input of heat caused by welding produces soft areas which cause the yield point of the frame to decrease. This phenomenon is not confined to high tensile strength steels; the input of heat also causes such defects in normal steels. When this occurs, the entire vehicle frame must be subjected to further processing directly after welding, at which time close attention is required to prevent frame deformation. Such processing requires large scale facilities and increases production steps and hence costs.

(3) Making the connecting lugs for the various pipes used in the frame from a light weight alloy is effective in reducing the proportion of lug weight in the total frame weight. However, because the lug and pipe are made of different materials, welding is impossible.

(4) Even in cases where brazing (a type of welding) is employed, the problems mentioned in item (2) are encountered, since the brazing temperature exceeds the annealing temperature.

(5) Whether or not lugs are used, the heating caused by welding can cause the frame to warp, so that, after welding, such warp must be corrected.

OBJECT OF THE INVENTION

It is an object of the present invention to overcome the aforementioned defects and disadvantages, and to provide a high quality permanent vehicle frame which is not subject to decrease in strength as a result of welding and the like.

It is a further object of the invention to provide a vehicle frame in which the lugs, which normally account for a high proportion of the frame weight, are made of a light weight alloy, so that the manufacture of a light weight frame is possible.

A further object of the invention is to simplify assembly, thereby decreasing the costs of construction.

BRIEF INTRODUCTION TO THE DRAWINGS

In order that the invention may be more clearly understood, reference will now be made to the accompanying drawings, in which several embodiments of the invention are shown for purposes of illustration, and in which FIGS. 1 and 2 are perspective views of frame portions constructed in accordance with the present invention;

FIG. 3 is a section view along line III—III of FIG. 2;

FIGS. 4 and 5 are perspective and side views, respectively, of a further embodiment of frame portions constructed in accordance with the invention; and FIG. 6 is a section view illustrating the use of adhesive in joining the pipe sections.

FIG. 7 shows a channel portion on the internal circumferential surface of a receptor arm to improve the strength of the adhesive joint.

FIGS. 8 and 9 show a dimple formed, respectively, on the inner circumferential surface of a receptor arm and on the outer circumferential surface of a frame element.

FIGS. 10 and 11 show a projection formed, respectively, on the inner circumferential surface of a receptor arm and on the outer circumferential surface of a frame element.

FIGS. 12 and 13 show a roughened surface formed, respectively, on the inner circumferential surface of a receptor arm and on the outer circumferential frame element.

FIG. 14 shows a receptor arm and a frame element having similar rectangular cross sections.

FIG. 15 illustrates a temporary or auxiliary attachment of a frame element to a receptor arm by bolting.

FIG. 16 illustrates a temporary auxiliary attachment of a frame element to a receptor arm by riveting.

FIG. 17 illustrates a temporary or auxiliary attachment of a frame element to a receptor arm by caulking.

FIG. 18 illustrates a temporary auxiliary attachment of a frame element to a receptor arm by spot welding.

DESCRIPTION OF PREFERRED EMBODIMENT

Figure 1:
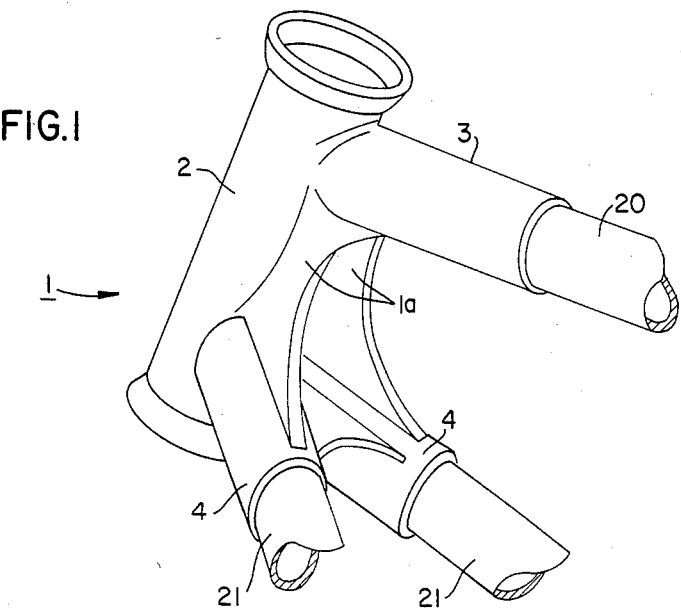

FIG. 1 shows a unitized lug 1 having a head pipe 2 and pipe receptor arms 3 and 4 with reinforcing ribs 1a. While the lug may be constructed of steel, as in the prior art, the present invention permits it to be constructed of light weight alloy, resulting in a lighter vehicle frame.

In assembling the frame, main pipe 20 and down tubes 21 are inserted into arms 3 and 4, respectively, and joined thereto by adhesive. It will be understood that the cross sections of the respective elements to be assembled are similar, e.g., circular or rectangular.

Figure 2:
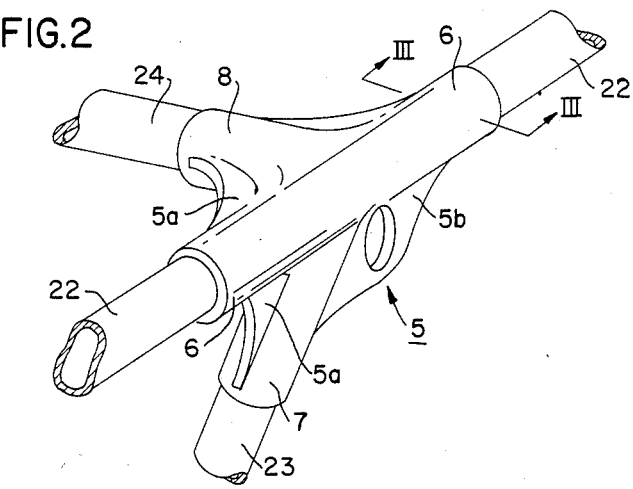
Figure 7:
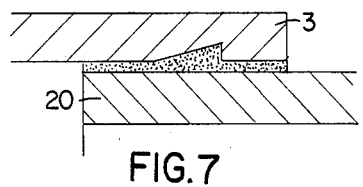
FIGS. 7 to 18 are detail section views illustrating various means for strengthening the attachment of a frame element to a receptor arm.
Figure 8:
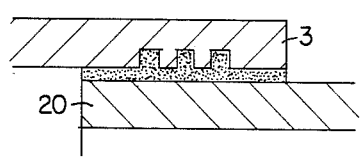
Figure 9:
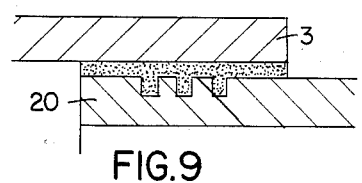
Figure 10:
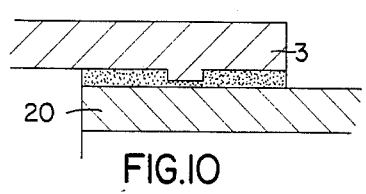
Figure 11:
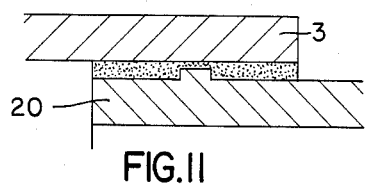
Figure 12:
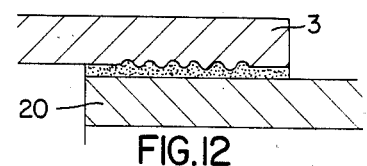
Figure 13:
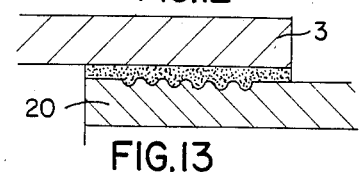
Figure 14:
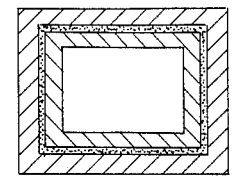
Figure 15:
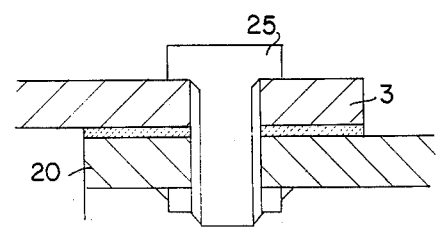
Figure 16:
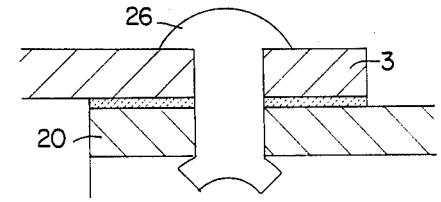
Figure 17:
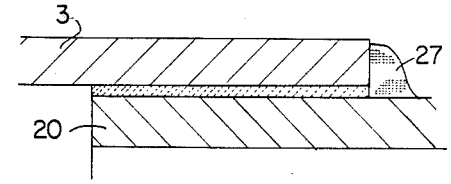
Figure 18:
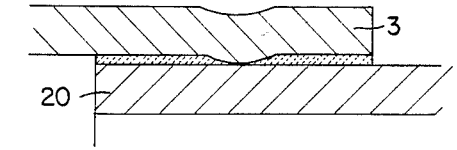

In FIG. 2, pipe receptors 6, 7 and 8 of unitized lug 5 are shown joining seat rail 22, back stay 23 and cross member 24. Reinforcing ribs 5a and 5b are provided.

FIG. 3 shows the dimensional relationships upon insertion of seat rail 22 into pipe receptor 6, by way of example. Similar relationships will of course apply to the joining of other elements.

It will be noted that the depth of insertion Q of seat rail 22 is at least twice as great as the wall thickness of the thinner of the two elements 22 and 6, i.e., the thinner of thicknesses t and t'. The clearance m between the two elements should be no greater than 1 mm. The reason for this dimensional relationship is that the adhesive A inserted in clearance space m provides the required connection shear strength, strength to withstand the moment of bending, and rigidity.

After insertion of each pipe into the multiple pipe receptors on each lug, a thermosetting resin such as epoxy or acrylic resin, which hardens between about 120° and 140° C., is injected into the clearance space m.

It is also possible to coat the outside circumference of the pipe with the adhesive prior to inserting it into the pipe receptor or the lug, or to coat the inside circumference of the pipe receptor area prior to insertion of the pipe. Moreover, as illustrated in FIGS. 15 to 18, the joining members may be secured temporarily by means of bolts 25, pins, rivets 26, caulking 27 or spot welding while the operation is performed. This enables preassembly of the frame to provide good operational efficiency and ease of transport to the next operation station, e.g., to the painting line. It can also be used as an auxiliary means to increase the strength of the joint.

After painting, the adhesive can be hardened in the paint baking process, which may include the following steps:

(1) Surface processing line: after degreasing the vehicle frame, a primer coat of a synthetic skin of zinc phosphate is applied.

(2) Finish painting: after cleaning the frame surface, using an air blower, for example, an amino alkyd resin (solid color) or an amino alkyd resin (metallic color) paint is applied with an electrostatic painting device. Since the resin is of the thermosetting type, it is baked in a furnace heated to between 120° and 140° C. for about 30 minutes.

As a result of this baking process, the adhesive is hardened simultaneously, thereby completing the assembly of the vehicle frame.

FIGS. 4 and 5 show a frame for a two-wheeled scooter type vehicle which employs a swing type power unit. Lug 9 having pipe receptors 10 and 11 connects down tube 25 and rear frame 26. Reinforcing ribs 9a are provided.

In order to increase the strength of the adhesive joints, dimples and projections, channels or roughened surfaces can be effectively used in the junction areas, i.e., the internal circumferential surfaces of the pipe receptors and the external circumferential surfaces of the pipe ends. For example, FIG. 6 shows a channel G on the outside circumferential surface of seat rail 22a, and this channel G increases the adhesive force of adhesive A in the direction of removal (arrow) of the seat rail. Moreover, toward the end of pipe receptor 6a, there is an increasing taper which augments the effect of adhesive A. FIGS. 7 to 14 illustrate others of the above-mentioned means for strengthening the attachment.

As will be clear from the foregoing description, lugs are used for the assembly of the frame, and a thermosetting resin is used to fill the joint areas between the lugs and pipes. Then, after the frames have been painted, the adhesive is hardened during the paint baking process. This has the following advantages:

(1) As opposed to welded joints, diverse materials for lugs and pipes may be joined together, so that a high tensile strength steel with thin walls may be used for the pipe material, while a light weight aluminum alloy may be used for the lugs, thereby greatly lightening the vehicle frame.

(2) The joining operations using an adhesive are much simpler than welding and do not require as much training or skill, so that productivity is improved.

(3) Paint baking temperatures are between about 120° and 140° C., so that there are no adverse effects on the processed steel pipe resulting from heating to temperatures above annealing temperature. Also, because of the adhesive joints, there are no weld deformities to cause stress accumulation. As a result, it is possible to utilize effectively high tensile strength steel pipe to achieve high strength and longevity. Because post-junction processing is obviated, facilities can be decreased and a number of processing steps eliminated.

(4) By using the paint baking process after painting, the adhesive is hardened, thereby eliminating a separate adhesive hardening process, reducing overhead and speeding up processing.

What is claimed is:

1. A process for manufacturing a pipe frame for a two- or three-wheeled vehicle, comprising the steps of inserting a frame element having an outer cross section into a receptor arm having an inner cross section slightly larger than said outer cross section filling the clearance space between said cross sections with thermosetting resin, and setting said resin simultaneously with the baking of finish of said pipe frame.

2. A process according to claim 1, wherein said frame element is inserted into said receptor arm to a depth at least twice as great as the wall thickness of the thinner of said frame element and said receptor arm.

3. A pipe frame made according to the process of claim 1, wherein said thermosetting resin is epoxy resin.

4. A pipe frame made according to the process of claim 1, wherein said thermosetting resin is acrylic resin.

5. A pipe frame made according to the process of claim 1, wherein said made of a light weight alloy.

6. A pipe frame made according to the process of claim 1, wherein said at least one frame element is made of high tensile strength steel.

7. A pipe frame made according to the process of claim 1, comprising auxiliary structure in the junction area to improve the strength of the joint.

8. A pipe frame made according to the process of claim 7, wherein said auxiliary structure comprises a channel portion on the internal circumferential surface of said receptor arm.

9. A pipe frame made according to the process of claim 7, wherein said auxiliary structure comprises a channel portion on the external circumferential surface of said frame element.

10. A pipe frame made according to the process of claim 8 or 9, comprising a tapered portion at the end of said receptor arm cooperating with said channel portion.

11. A pipe frame made according to the process of claim 7, wherein said auxiliary structure comprises at least one dimple on the internal circumferential surface of said at least one receptor arm.

12. A pipe frame made according to the process of claim 7, wherein said auxiliary structure comprises at least one dimple on the external circumferential surface of said frame element.

13. A pipe frame made according to the process of claim 7, wherein said auxiliary structure comprises at least one projection on the internal circumferential surface of said at least one receptor arm.

14. A pipe frame according to the process of claim 7, wherein said auxiliary structure comprises at least one projection on the external circumferential surface of said frame element.

15. A pipe frame according to the process of claim 7, wherein said auxiliary structure comprises a roughened surface on the internal circumferential surface of said receptor arm.

16. A pipe frame according to the process of claim 7, wherein said auxiliary structure comprises a roughened surface on the external circumferential surface of said at least one frame element.

17. A process according to claim 1, wherein said clearance space is no greater than 1 mm.

18. A pipe frame according to the process of claim 1, wherein said receptor arm and said frame element have similar circular cross sections.

19. A pipe frame according to the process of claim 1, wherein said at least one receptor arm and said at least one frame element have similar rectangular cross sections.

20. A process according to claim 1, wherein said resin is injected into said clearance space.

21. A process according to claim 1, the inner circumferential surface of said receptor arm is coated with said resin prior to insertion of said frame element thereinto.

22. A process according to claim 1, wherein the outer circumferential surface of said frame element is coated with said resin prior to its insertion into said receptor arm.

23. A process according to claim 1, comprising auxiliary attachment of said frame element to said receptor arm to provide operational stability.

24. A process according to claim 23, wherein said auxiliary attachment comprises bolting.

25. A process according to claim 23, wherein said auxiliary attachment comprises riveting.

26. A process according to claim 23, wherein said auxiliary attachment comprises caulking.

27. A process according to claim 23, wherein said auxiliary attachment comprises spot welding.

* * * * *